E. D. WESTON.
Cooking Stove.
No. 77,688.
Patented May 5, 1868.
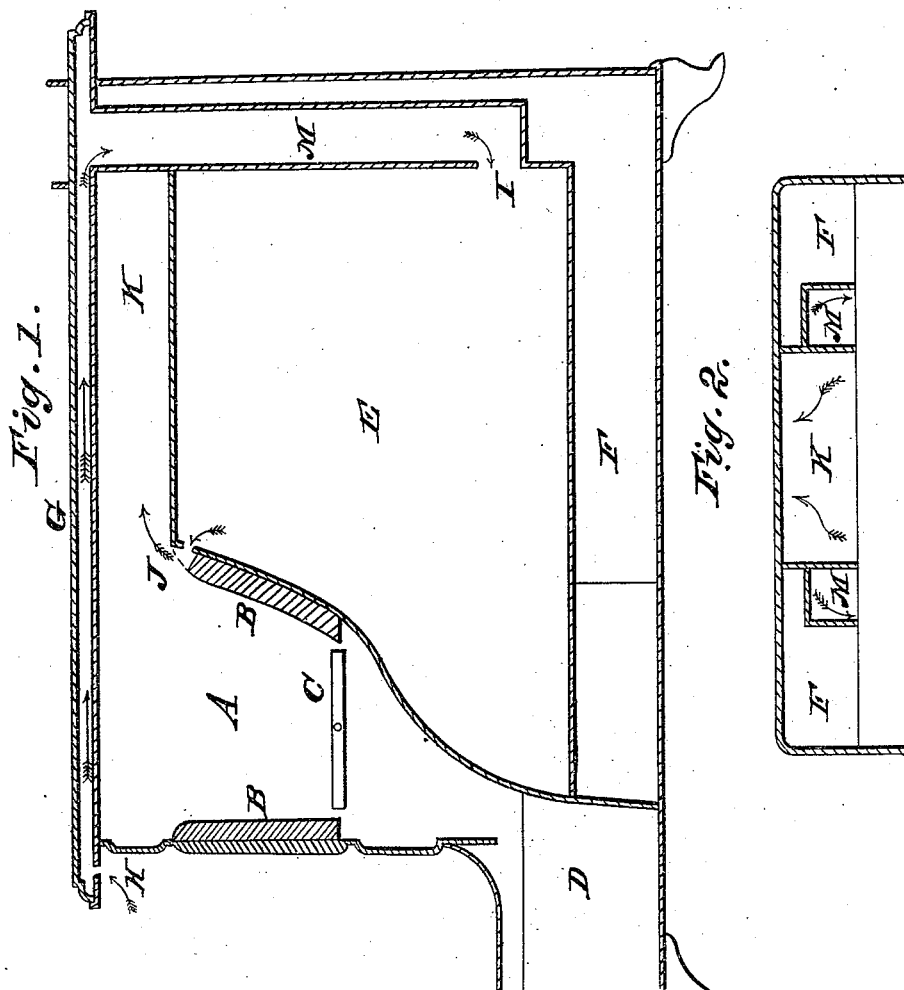
Witnesses:
Leml. T. Talbot
Isaac C. Howland
Inventor:
Erastus D. Weston

United States Patent Office.

ERASTUS D. WESTON, OF TAUNTON, MASSACHUSETTS.

Letters Patent No. 77,688, dated May 5, 1868.

IMPROVEMENT IN COOKING-STOVES.

*The Schedule referred to in these Letters Patent and making part of the same.*

TO ALL WHOM IT MAY CONCERN:

Be it known that I, ERASTUS D. WESTON, of Taunton, in the county of Bristol, and State of Massachusetts, have invented certain new and useful Improvements in Cooking-Stoves; and I do hereby declare that the following is a full, clear, and exact description thereof, reference being had to the accompanying drawings, making a part of this specification, in which—

Figure 1 is a sectional view through the centre, and

Figure 2 a bird's-eye view of a portion of the top of the stove, with the upper plate removed, showing the various flues.

The same letters refer to the same parts in both figures.

A represents the fire-chamber; B B, the front and back linings; C, the grate; D, the ash-pit; E, the oven; F, the return-flue; G, the hollow top; H, openings for the admission of cold air; I, an opening connecting the lower part of the oven with the flue M; J, small holes for the passage of the heated air of the oven into the direct draught K.

The operation is as follows: The cold air entering the hollow or double top G at H, at the under side of that portion of the top that projects beyond or outside of the front jambs of the stove, follows the course indicated by the arrows, (that is, from the front to the back of the stove,) passing directly over the fire, and down the flue M, it becomes heated in its course, and enters the oven through the opening I. Here it imparts its heat to whatever may be in the oven, and circulating therein, it passes off through the holes J in the front oven-plate into the direct draught K, from whence it is carried into the pipe.

By having the whole top composed of two plates of metal, with a current of air between them, there is not that liability to warp or settle that is such a prolific source of complaint in all single-topped cooking-stoves; and also, the air being heated as it enters the oven, reduces the amount of fuel required to obtain the degree of heat in the oven necessary to success in baking, and this heated air, thus introduced, equalizes the heat in the whole oven, baking as well on the rack, midway, as on the bottom plate.

I am aware that it is not new to introduce heated air into the oven of a stove by flues arranged between the oven and the fireplace, and extending over the top of the oven, and between it and the smoke-escape flue of the fireplace, such being as represented in the United States Patent, No. 35,141.

My invention differs materially from such, as my horizontal hot-air flue is not interposed between the ovens and the smoke-escape flue leading from the fireplace, but is arranged over such flue, so as to cause the oven to be heated not only by heat abstracted from such smoke-flue and radiated through the top of the oven, but by air passing over the top of the smoke-flue. Thus it will be seen that with my improvement I get heat into the oven from both the top and bottom of the smoke-flue, which is not the case in the stove described in such patent.

I am aware that it is not new to arrange an air-heating flue over the top of the smoke-flue of a stove, and to open such air-heating flue into a flue surrounding an oven raised above the smoke-flue, the oven being heated by the air-heating flues only, such being as shown in the United States Patent, No. 21,731. My invention differs from this latter, as I introduce the hot air into the oven and heat the oven by smoke-flues going around it.

What, therefore, I claim as my invention or improvement, is as follows:

I claim the arrangement of the air-heating flue G, the fireplace A, the smoke-flue K, the oven E, and the air-flue or flues M, provided with one or more openings, I, to lead air into the oven, as set forth.

I also claim the arrangement of one or more openings, J, with the flue G, the fireplace A, the oven E, one or more openings I, the flue or flues M, and the air-flue G.

I also claim the arrangement of the air-flue G, and its induction-openings H, so as to extend over and in front of the front plate of the fireplace, as represented.

I also claim the arrangement of the air-flues G M, the oven E, the fireplace A, the smoke-flue K, and flues F, underneath and in rear of the oven, the oven being provided with the air-induction and eduction openings I J, as set forth.

ERASTUS D. WESTON.

Witnesses:
LEML. T. TALBOT,
ISAAC C. HOWLAND.